(12) United States Patent
Xu et al.

(10) Patent No.: US 10,223,421 B2
(45) Date of Patent: Mar. 5, 2019

(54) VIRTUAL AGGREGATION

(71) Applicant: SAP SE, Walldorf (DE)

(72) Inventors: Huixin Xu, Shanghai (CN); Yingyu Chen, Shanghai (CN); Juan Qi, Shanghai (CN)

(73) Assignee: SAP SE, Walldorf (DE)

( * ) Notice: Subject to any disclaimer, the term of this patent is extended or adjusted under 35 U.S.C. 154(b) by 523 days.

(21) Appl. No.: 14/983,603

(22) Filed: Dec. 30, 2015

(65) Prior Publication Data

US 2017/0193022 A1    Jul. 6, 2017

(51) Int. Cl.
*G06F 17/30* (2006.01)

(52) U.S. Cl.
CPC .............. *G06F 17/30489* (2013.01)

(58) Field of Classification Search
None
See application file for complete search history.

(56) References Cited

U.S. PATENT DOCUMENTS

| | | | | |
|---|---|---|---|---|
| 7,133,865 B1* | 11/2006 | Pedersen | ........... | G06F 17/30457 |
| 8,041,670 B2* | 10/2011 | Bakalash | .......... | G06F 17/30489 |
| | | | | 707/603 |
| 8,495,007 B2* | 7/2013 | Williamson | ...... | G06F 17/30592 |
| | | | | 707/607 |
| 8,612,421 B2* | 12/2013 | Dombroski | ....... | G06F 17/30592 |
| | | | | 707/713 |
| 8,781,997 B2* | 7/2014 | Schwerk | .......... | G06F 17/30592 |
| | | | | 707/603 |
| 9,430,519 B1* | 8/2016 | Cai | .................... | G06F 17/30457 |
| 9,430,530 B1* | 8/2016 | Desai | ................ | G06F 17/30489 |
| 2002/0129032 A1* | 9/2002 | Bakalash | .......... | G06F 17/30457 |
| 2009/0043735 A1* | 2/2009 | Otter | ................ | G06F 17/30433 |
| 2011/0131173 A1* | 6/2011 | Fernandez Ortega | | ...................... |
| | | | | G06F 17/30386 |
| | | | | 707/602 |
| 2015/0363465 A1* | 12/2015 | Bordawekar | ..... | G06F 17/30463 |
| | | | | 707/718 |

\* cited by examiner

*Primary Examiner* — Jeff A Burke
(74) *Attorney, Agent, or Firm* — Klarquist Sparkman, LLP

(57) ABSTRACT

A framework for performing aggregation methods on hierarchical data objects is described herein. A data aggregation request is received, the request including a tree of nodes to aggregate, an aggregation method, and a filter criteria. A configuration table is used to identify previously generated aggregation hierarchies that correspond to the received request, and a mapping of attributes of the received nodes to attributes of the previously generated aggregation hierarchies. For each node in the tree of nodes, when a corresponding node in the previously generated aggregation hierarchy is identified, attribute values from the corresponding node are used to create a node in a target aggregation hierarchy. When a corresponding node does not exist, but corresponding child nodes do exist in the previously generated aggregation hierarchy, the aggregation method is applied to the corresponding child nodes and the result is used to create a node in the target aggregation hierarchy.

20 Claims, 6 Drawing Sheets

600

VIRTUAL AGGREGATION

BACKGROUND

Performing data aggregation methods on hierarchical data can be challenging, particularly on large volumes of data, and on data stored in a relational database. Hierarchical data, in which entities are described as a tree, or with a parent/child relationship, is not easily described or queried with Structured Query Language (SQL). Moreover, such calculations tend to be resource intensive, particularly at scale.

Therefore, there is a need for an improved framework that addresses the abovementioned challenges.

SUMMARY

Disclosed is a framework for performing aggregation methods on hierarchical data objects. In one embodiment, a data aggregation request is received, the request including a tree of nodes to aggregate, an aggregation method, and a filter criteria. A configuration table is used to identify previously generated aggregation hierarchies that correspond to the received request, and a mapping of attributes of the received nodes to attributes of the previously generated aggregation hierarchies. For each node in the tree of nodes, when a corresponding node in the previously generated aggregation hierarchy is identified, attribute values from the corresponding node are used to create a node in a target aggregation hierarchy. When a corresponding node does not exist, but corresponding child nodes do exist in the previously generated aggregation hierarchy, the aggregation method is applied to the corresponding child nodes and the result is used to create a node in the target aggregation hierarchy. When neither a corresponding node nor corresponding child nodes exist in the previously generated aggregation hierarchy, the aggregation method is applied to each of the node's children, with the result used to create a node in the target aggregation hierarchy.

In one embodiment, the target aggregation hierarchy comprises a report. One exemplary aggregation method is summation. As such, one exemplary embodiment includes summing sales data from multiple regions to generate a sales report. Throughout this disclosure, reports are commonly used as exemplary aggregation hierarchies. However, this is merely a convenience, and other types of aggregation hierarchies are similarly contemplated, including aggregation hierarchies that are used to control machinery, to alter transportation resources, and the like.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

Figure 1:
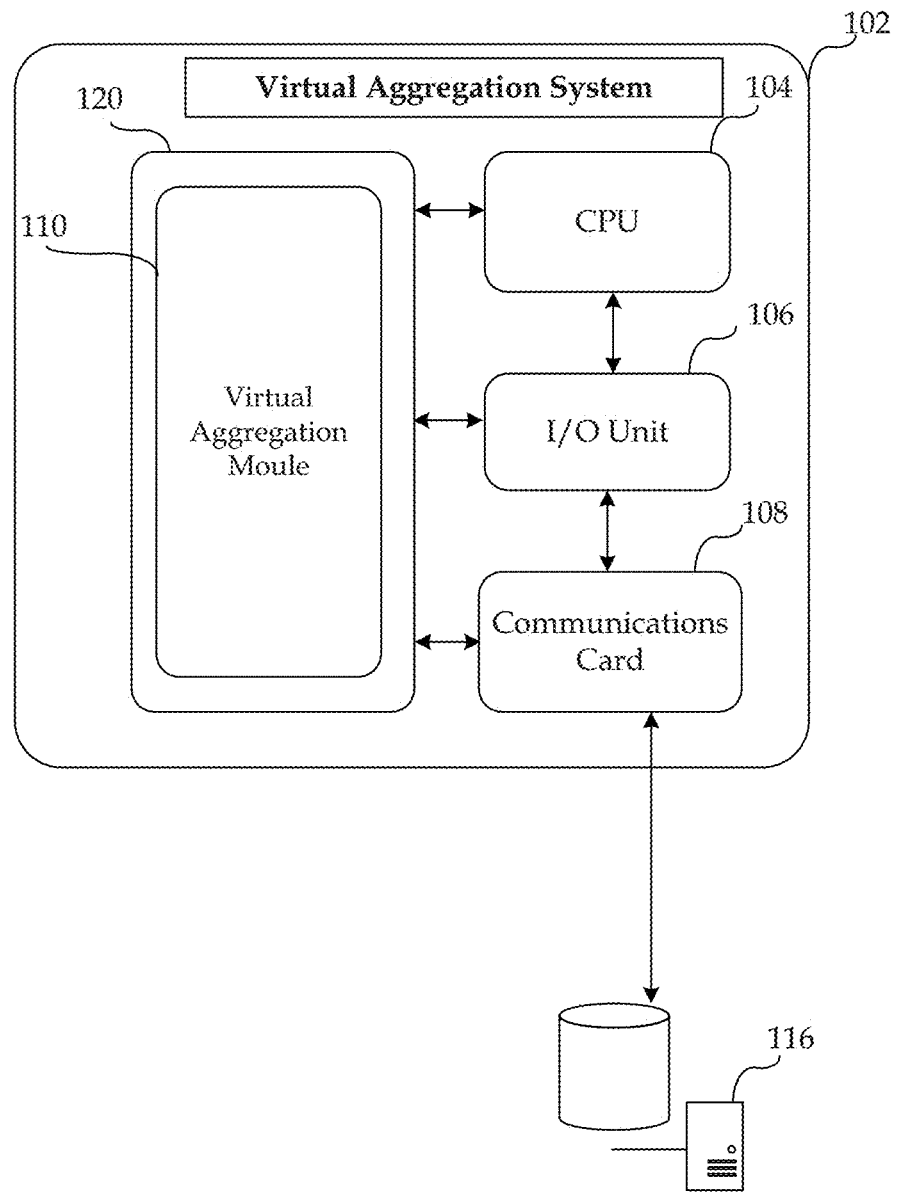
FIG. 1 is a block diagram illustrating an exemplary architecture.

FIG. 1 is a block diagram illustrating an exemplary architecture 100 that may be used to implement object registration as described herein. Generally, architecture 100 may include a virtual aggregation system 102 and a data repository 116.

The virtual aggregation system 102 can be any type of computing device capable of responding to and executing instructions in a defined manner, such as a workstation, a server, a portable laptop computer, another portable device, a touch-based tablet, a smart phone, a mini-computer, a mainframe computer, a storage system, a dedicated digital appliance, a device, a component, other equipment, or a combination of these. The system may include a central processing unit (CPU) 104, an input/output (I/O) unit 106, a memory module 120 and a communications card or device 108 (e.g., modem and/or network adapter) for exchanging data with a network (e.g., local area network (LAN) or a wide area network (WAN)). It should be appreciated that the different components and sub-components of the system may be located on different machines or systems. Memory module 120 may include virtual aggregation module 110.

The virtual aggregation system 102 may be communicatively coupled to one or more other computer systems or devices via the network. For instance, the system may further be communicatively coupled to one or more data repository 116. The data repository 116 may be, for example, any database (e.g., relational database, in-memory database, etc.). The data repository 116 may also be referred to as a catalog, and may contain tables, views, stored procedures, and the like.

Virtual aggregation module 110 includes a logic for performing aggregation methods on hierarchical data objects. A hierarchical data object is a data object that contains one or more hierarchical attributes. Hierarchical attributes contrast with flat attributes, such as Age, Height, Name, etc., which are trivially aggregated. Examples of hierarchical attributes include locations, product categories, or any other type of data that can be represented in a tree structure in which a given node is encompassed by or included in a parent node. For example. North America contains Canada, which contains British Colombia, which contains Vancouver, and so nodes containing these locations are hierarchical. Node attributes such as Age are not hierarchical, as one age does not encompass or include another.

In one embodiment, hierarchical attributes are associated with a layer, e.g., a number indicating the layer. Continuing the example above, North America may be a top-level location, having a layer of 1, while Canada has a layer of 2, British Colombia 3, and Vancouver 4. Other numbering and ordering schemes are similarly contemplated.

It is often desirable to generate reports based on hierarchical data. However, in order to avoid wasting computing resources, it is desirable to reuse already calculated information, as recalculating a report from scratch would unnecessarily consume significant amounts of processing and storage capacity. In order to effectively reuse calculations, techniques are described herein to accurately detect when attributes from a node in a previously calculated aggregation hierarchy may be used to generate a report. Also, it is desirable to determine what attributes are flat and what attributes are hierarchical, such that re-use of existing layers can be achieved when objects are hierarchical. Also, it is desirable to identify partially overlapping hierarchies (i.e., the tree of nodes which has some branches in common with an existing aggregation hierarchy) such that already calculated values can be utilized in generating a target aggregation hierarchy.

In one embodiment, a data aggregation request is received, including a tree of nodes, an aggregation method, and a filter criteria. Configuration settings, such as a configuration table, are queried to identify previously generated aggregation hierarchies that correspond to the received request, including a mapping of attributes from the received nodes to attributes in the previously generated aggregation hierarchies. For each node in the tree of nodes, when a corresponding node in the previously generated aggregation hierarchy is identified, attribute values from the corresponding node are used to create a node in a target aggregation hierarchy. When a corresponding node does not exist, but corresponding child nodes do exist in the previously generated aggregation hierarchy, the aggregation method is applied to the corresponding child nodes and the result is used to create a node in the target aggregation hierarchy. When neither a corresponding node nor corresponding child nodes exist in the previously generated aggregation hierarchy, the aggregation method is applied to each of the node's children, with the result used to create a node in the target aggregation hierarchy. In one embodiment, the tree of nodes is traversed in a "bottom-up" direction, meaning that nodes at the lowest level of the hierarchy (i.e., nodes associated with the highest "Layer" attribute) are processed first. However, top-down, in-order, random order, or any other processing sequences are similarly contemplated.

Figure 2:
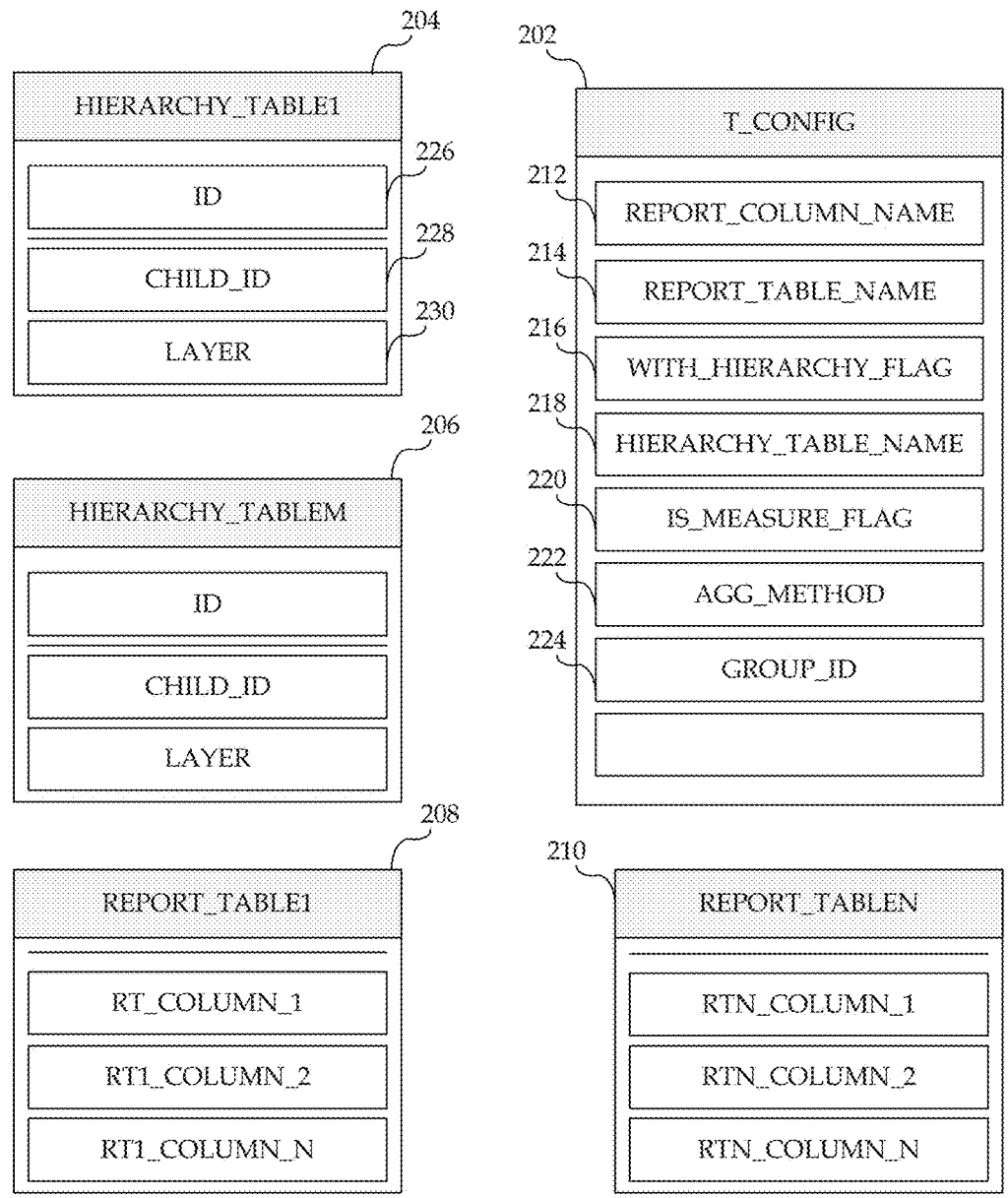
FIG. 2 illustrates a number of database table schemas used to store node trees, reports, and configuration data.

FIG. 2 illustrates a number of database table schemas 200 used to store node trees, reports, and configuration data. Specifically, FIG. 2 depicts schemas T_CONFIG 202, HIERARCHY_TABLE1 204, HIERARCHY_TABLEM 206, REPORT_TABLE1 208, and REPORT_TABLEN 210.

T_CONFIG 202 contains configuration information, as described in Table 1 below:

TABLE 1

| Column | Description | Example |
| --- | --- | --- |
| REPORT_COLUMN_NAME 212 | The primary key of the T_CONFIG table. Contains a column name from a report table. | LOCATION_ID |
| REPORT_TABLE_NAME 214 | The name of the report table to which the column belongs. | SALES_MOTHLY_REPORT |
| WITH_HIERARCHY_FLAG 216 | Indicates whether the column is a common column or a column with a hierarchy. | 1: a column with a hierarchy 0: a common column |
| HIEARCHY_TABLE_NAME 218 | The hierarchy relationship of the column if WITH_HIERARCHY_FLAG 216 = 1 | T_LOCATION_HIEARCHY |
| IS_MEASURE_FLAG 220 | Indicates whether the column_name is a measure or a dimension. If it is a measure, it will be used to do the aggregation. If it is a dimension, it will be used to check whether the two records should be aggregated together or not. | 1: a measure 0: not a measure |
| AGG_METHOD 222 | The aggregation method for the column value of the measure. | SUM |
| GROUP_ID 224 | Columns with the same group ID have the same business meaning. If IS_MEASSURE_FLAG = 1, then columns with the same group ID can be used to do the aggregation. If IS_MEASSURE_FLAG = 0, then they can be used to do the filter with the same criteria. | 1 |

HIERARCHY_TABLE1 204 contains hierarchy information. In one embodiment, hierarchy information is accessed by retrieving HIERARCHY_TABLE_NAME 218 from T_CONFIG 202. HIERARCHY_TABLE1 204 contains information contained in Table 2 below:

TABLE 2

| Column | Description | Example |
| --- | --- | --- |
| ID 226 | The root ID of the hierarchy table | 1 |
| CHILD_ID 228 | The child ID of the root ID | 2 |
| LAYER 230 | The layer to which the child belongs | 2 |

However, other techniques for representing a hierarchy are similarly contemplated, including edges and vertices in a graph database.

REPORT_TABLE 208 contains an aggregation hierarchy—specifically, a report. In one embodiment, reports contain dimension columns and measure columns. Measure columns can be aggregated. For example, summing sales data, or counting a number of products being sold by product category. Dimension columns determine whether a node from a report is usable in another aggregation operation.

Figure 3:
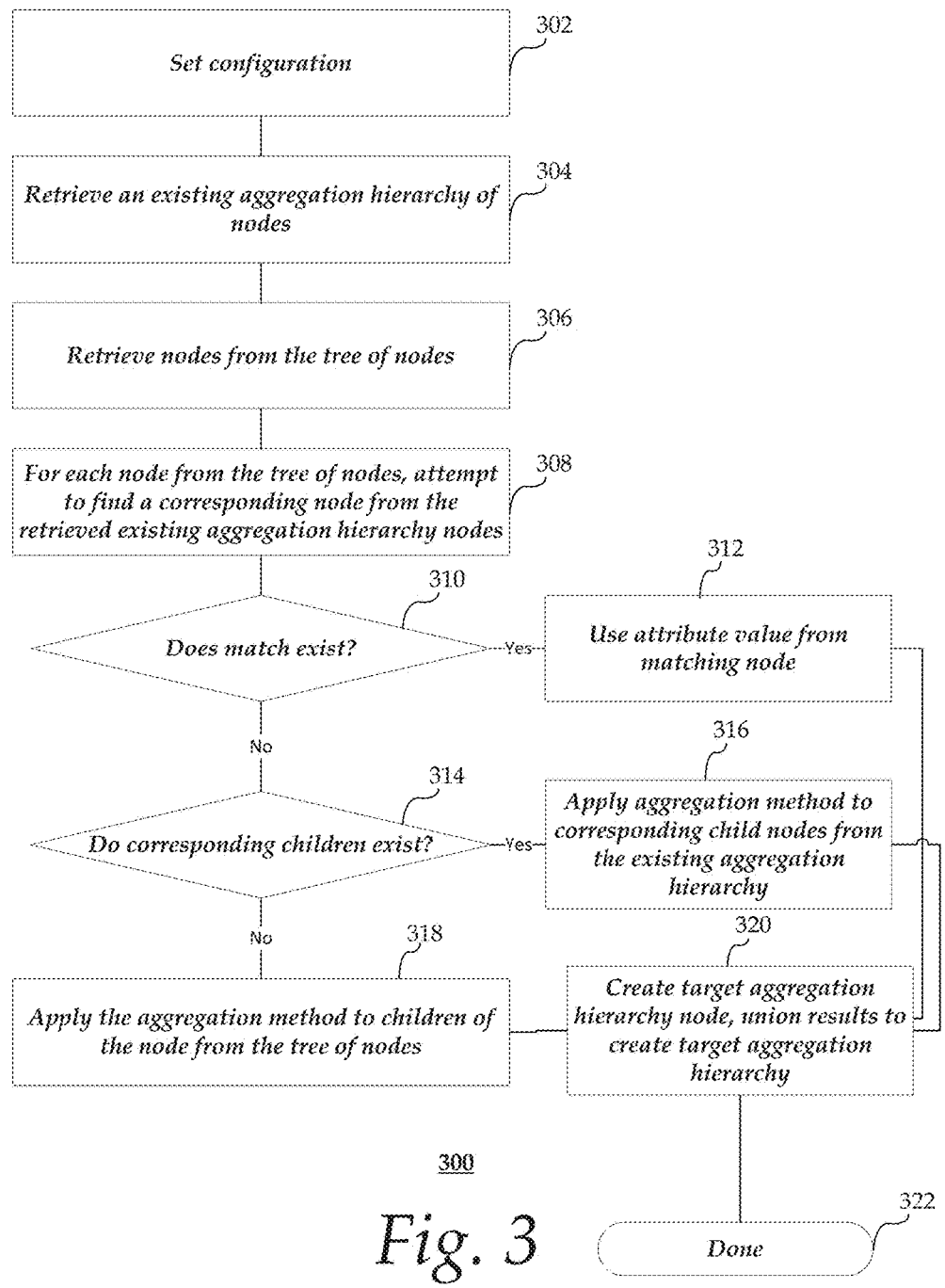
FIG. 3 is a flow chart illustrating one embodiment of virtual aggregation.

FIG. 3 is a flow chart 300 illustrating one embodiment of virtual aggregation. The process may be performed automatically or semi-automatically by the virtual aggregation system 102, described above with reference to FIG. 1.

At block 302, the configuration is set. In one embodiment, configuration settings of an aggregation operation are determined based on business requirements. For example, the IS_MEASURE_FLAG 220 is set on a column of the target report based on a business requirement that the column represents what is being aggregated. Similarly, the WITH_HIERARCHY_FLAG 216 is set on a column of the target report based on a business requirement that the column represents hierarchical data, e.g., location data, product category, etc.

In one embodiment, configuration settings are set in a table like T_CONFIG 202, as described above with regard to FIG. 2. Each entry in the configuration table represents an attribute of a node, both nodes of existing reports and nodes of the target report. Information contained in T_CONFIG 202 is generally useful for determining if an existing report contains the same business meaning as the target report.

If it is determined that an existing report contains the same business meaning as the target report, then, in one embodiment, the measure column, the common column, and the hierarchical column of the existing report is set based on the values of the target report. For example, the IS_MEASURE_FLAG 220 on the existing report column is set to the value of the IS_MEASURE_FLAG 220 of the column of the target report that shares a GROUP_ID 224. The WITH_HIERARCHY_FLAG 216 is similarly set based on a shared GROUP_ID 224.

At block 304, an existing aggregation hierarchy of nodes is retrieved. In one embodiment, the retrieved aggregation hierarchy of nodes comprises a previously computed report.

At block 306, nodes from the received tree of nodes are retrieved. In one embodiment these nodes are retrieved by traversing a hierarchy table, such as HIERARCHY_TABLE1 204 discussed above with regard to FIG. 2.

At block 308, each node of the tree of nodes is visited, a search for a corresponding node from one or more existing aggregation hierarchies is performed.

At decision 310, a decision is made whether the node in question can be matched to a node from one or more existing aggregation hierarchies. In one embodiment, a match is made when the GROUP_ID 224 of the node in question matches the GROUP_ID 224 of a node from one or more existing aggregation hierarchies. If a match is found, the process proceeds to block 312. If no match is found, the process proceeds to decision 314.

At block 312, an attribute with IS_MEASURE_FLAG 220 set to true is sent to block 320 for processing.

At decision 314, a decision is made whether the children of the node in question have corresponding nodes in one or more existing aggregation hierarchies. If matching child nodes are found, the process proceeds to block 316. If not all child nodes can be matched, then the process proceeds to block 318.

At block 316, the aggregation method is applied to the corresponding child nodes from the one or more existing aggregation hierarchies. The resulting value is sent to block 320 for processing.

At block 318, the aggregation method is applied to the children of the node in question. The resulting value is sent to block 320 for processing.

At block 320, a received result of the aggregation method, whether copied from corresponding nodes (block 312), or the result of applying the aggregation method to child nodes (318) or corresponding child nodes (316), is used to generate a node in the target aggregation hierarchy.

At block 322, the process 300 ends.

Figure 4:
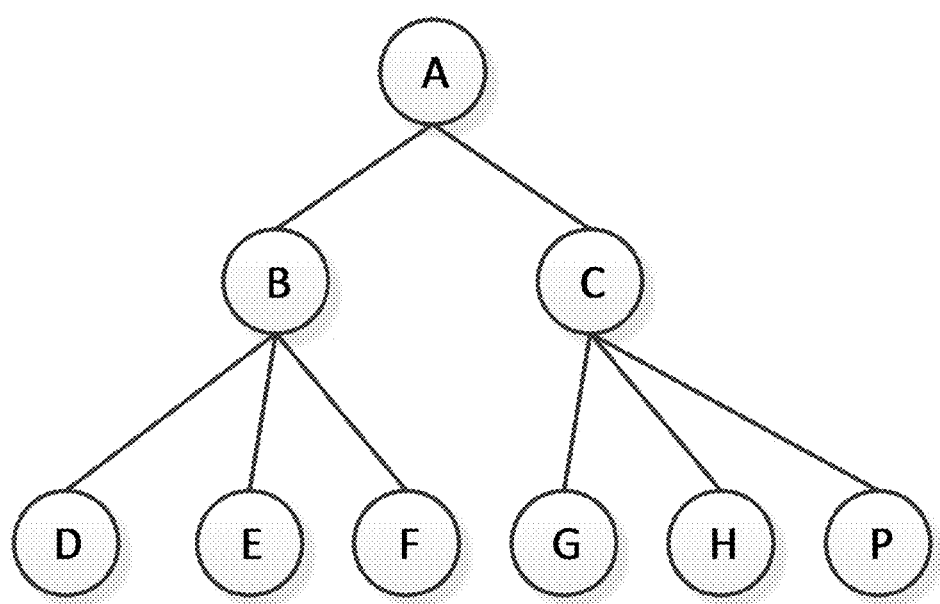
FIG. 4 illustrates a target node hierarchy.
Figure 5:
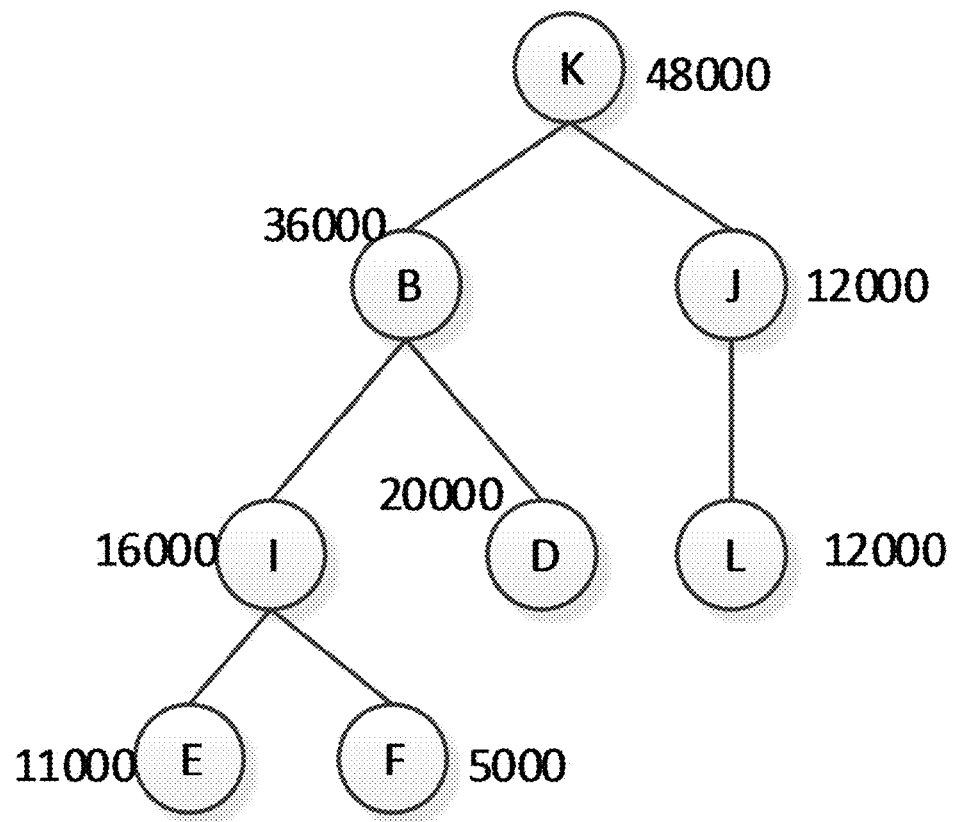
FIG. 5 illustrates existing aggregation hierarchies.
Figure 5:
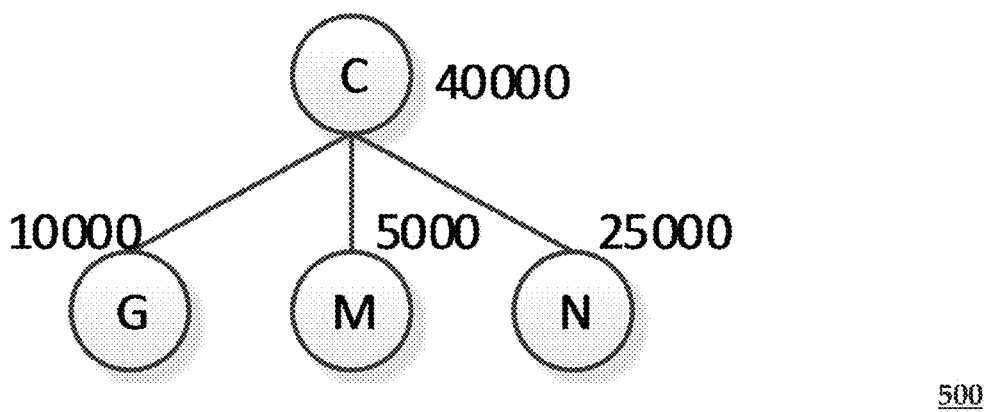
Figure 6:
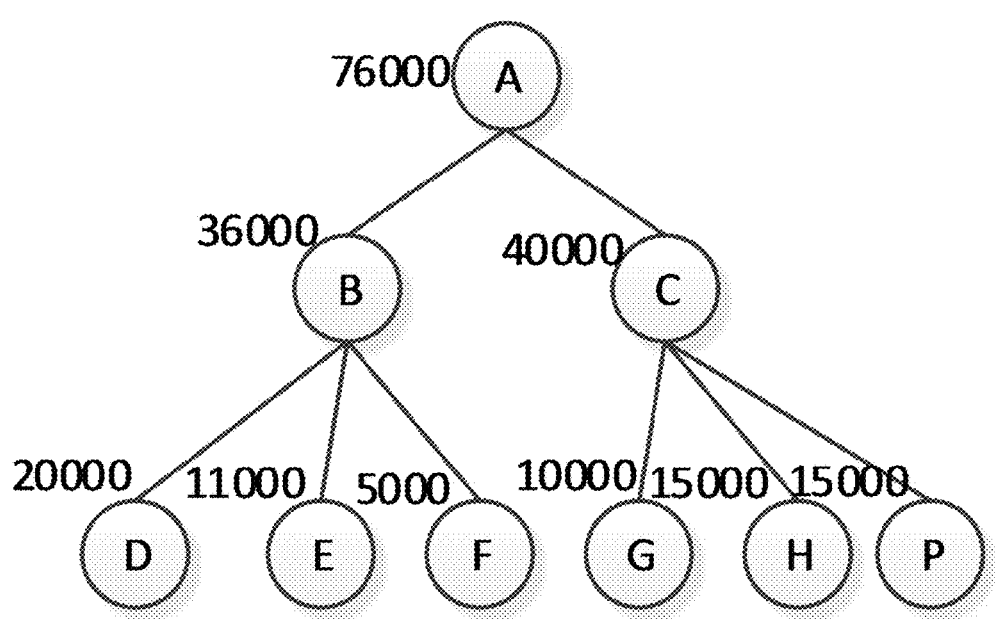
FIG. 6 illustrates a target aggregation hierarchy.

FIGS. 4-6 depict an exemplary application of one disclosed embodiment of generating a monthly sales report by region. The report is, for example, for product 'P_123' sold in June, 2014. The output of the report will include, for example, columns "LocationID", "Time", "ProductType", and "Total_Sale". Total Sale is a measure column, while LocationID, Time, and ProductType are dimension columns, because Total_Sale is the column to which the aggregation method, SUM, is applied, while LocationID, Time, and ProductType are used to filter out existing report nodes and to match target report nodes to existing report nodes.

In this example, a retail company has branches that are grouped hierarchically by location. Table 3 below depicts an exemplary hierarchy table of retail locations A, B, C, D, E, F, G, H, and P, which is graphically depicted as a target node hierarchy 400 in FIG. 4.

TABLE 3

| ID | Child_ID | Layer |
|----|----------|-------|
| A  | B        | 1     |
| A  | C        | 1     |
| B  | D        | 2     |
| B  | E        | 2     |
| B  | F        | 2     |
| C  | G        | 2     |
| C  | H        | 2     |
| C  | P        | 2     |

The retailer has already commissioned reports RA_SALE and RB_SALE for stores A and B, respectively. RA_SALE sample data is depicted in Table 4 below:

TABLE 4

| Location | Time   | EquipType | Total_Value |
|----------|--------|-----------|-------------|
| B        | 201406 | P_123     | 36000       |
| I        | 201406 | P_123     | 16000       |
| D        | 201406 | P_123     | 20000       |
| B        | 201407 | P_123     | 32000       |
| E        | 201406 | P_123     | 11000       |
| J        | 201407 | P_345     | 15000       |
| K        | 201408 | P_123     | 54000       |
| F        | 201406 | P_123     | 5000        |
| J        | 201406 | P_123     | 12000       |
| K        | 201406 | P_123     | 48000       |

While RB_SALE sample data is depicted in Table 5 below:

TABLE 5

| LocID | Date   | EquipType | Total_Num |
|-------|--------|-----------|-----------|
| C     | 201406 | P_123     | 40000     |
| G     | 201406 | P_123     | 10000     |
| M     | 201406 | P_123     | 5000      |
| N     | 201407 | P_345     | 4000      |
| N     | 201406 | P_123     | 25000     |

From this, configuration table T_CONFIG is setup, enabling dynamic detection of measure/dimension columns and hierarchical/flat columns during the computation of the target report. In one embodiment the table is configured once, and may then be used in future report generation. However, it is also contemplated that the T_CONFIG table is configured multiple times. Note that the corresponding columns in target reports and existing reports should belong to the same group (have the same GROUP_ID). For example, Total_Value and Total_Num are measures from the existing reports, and they are reused for column Total_Sale in the target report, so the GROUP_ID of the three columns are the same (GROUP_ID=4) in, for example, Table 6 below:

If the nodes are not in the reusable hierarchies but all its children nodes are in, for example for [A], its children B and C both have results, then sum them up A=B+C=76000.

If neither the nodes nor their children nodes are in the reusable hierarchies, then calculate from the scratch.

The final result for the target hierarchy is depicted in FIG. 6.

TABLE 6

| REPORT_COLUMN_NAME | REPORT_TABLE_NAME | WITH_HIERARCHY_FLAG | HIEARARCHY_TABLE_NAME |
|---|---|---|---|
| LocationID | TR_SALE | 1 | T_HIER1 |
| Time | TR_SALE | 0 | NULL |
| EquipType | TR_SALE | 0 | NULL |
| Total_Sale | TR_SALE | 0 | NULL |
| Location | RA_SALE | 1 | T_HIER2 |
| Time | RA_SALE | 0 | NULL |
| EquipType | RA_SALE | 0 | NULL |
| Total_Value | RA_SALE | 0 | NULL |
| LocID | RB_SALE | 1 | T_HIER3 |
| Date | RB_SALE | 0 | NULL |
| EquipType | RB_SALE | 0 | NULL |
| Total_Num | RB_SALE | 0 | NULL |

| REPORT_COLUMN_NAME | IS_MEASURE_FLAG | AGG_METHOD | GROUP_ID |
|---|---|---|---|
| LocationID | 0 | NULL | 1 |
| Time | NULL | NULL | 2 |
| EquipType | 0 | NULL | 3 |
| Total_Sale | 1 | SUM | 4 |
| Location | 0 | NULL | 1 |
| Time | 0 | NULL | 2 |
| EquipType | 0 | NULL | 3 |
| Total_Value | 1 | SUM | 4 |
| LocID | 0 | NULL | 1 |
| Date | 0 | NULL | 2 |
| EquipType | NULL | NULL | 3 |
| Total_Num | NULL | SUM | 4 |

The reporting computation is as follows:

Retrieve the measure columns Total_Sale of the target report based on the requirements and the measure columns of existing reports with the same GROUP_ID 4 from the T_CONFIG table, which are RA_SALE.Total_Value and RB_SALE.Total_Num.

Retrieve the common columns Time, EquipType of the target report based on the requirements and common columns of existing reports with the same GROUP_ID 2, 3 from the T_CONFIG table, which are RA_SALE.TIME, RA_SALE.EquipType, RB_SALE.Date, RB_SALE.EquipType.

Retrieve the hierarchical column LocationID of the target report based on the requirements and hierarchical columns of existing reports with the same GROUP_ID 1 from the T_CONFIG table, which are RA_SALE.Location and RB_SALE.LocID.

Filter the existing reports results using common columns, which means selecting from RA_SALE with Time='201406' and EquipType='P_123', selecting from RB_SALE with Date='201406' and EquipType='P_123'. Then, based on the hierarchy tables for the existing reports, calculate two hierarchies that can be reused for the next computation. These hierarchies, having root nodes K and C, are depicted in FIG. 5.

Retrieve all the nodes for the hierarchical columns of the target report, that is, [A, B, C, D, E, F, G, H, P], and find in the reusable hierarchies whether the values of the nodes have already been calculated. There may be different search results:

If the nodes are in the reusable hierarchies, for example [B,C,D,E,F,G], then reuse the results directly.

What is claimed is:

1. A computer-implemented method, using a computing device comprising one or more processors and one or more memories coupled to the one or more processors, the one or more memories storing computer-executable instructions to cause the one or more processors to perform operations for executing a query to generate and return a report attribute aggregation result, the operations comprising:
receiving a request to generate a report, the report associated with at least one hierarchical report attribute;
evaluating a plurality of target report attributes, the evaluating comprising evaluating a flag indicating whether a respective attribute is associated with a hierarchy;
for report attributes determined to be associated with a hierarchy:
retrieving attributes associated with one or more existing reports;
comparing semantic identifiers of target report attributes with semantic identifiers of attributes of the one or more existing reports;
for target report attributes having a semantic identifier matching a semantic identifier of an existing report attribute, generating a data aggregation request, the data aggregation request comprising a tree of nodes, each node having a semantic identifier, and an aggregation method; and
executing the data aggregation request to generate a target aggregation hierarchy, the executing the data aggregation request comprising:
for each node in the tree of nodes having a corresponding node in the existing aggregation hierarchy, determined by comparing the semantic identifier for a respective node of the tree of nodes with one or more semantic identifiers of respective one or more nodes of the existing aggregation hierarchy, creating a node in the target aggregation hierarchy by retrieving a value of the respective corresponding node and storing the value in the respective created node;

for each node in the tree of nodes that does not have a corresponding node in the existing aggregation hierarchy, determined by comparing the semantic identifier for a respective node of the tree of nodes with one or more semantic identifiers of respective one or more nodes of the existing aggregation hierarchy, but does have, for each child node of one or more child nodes of the respective node of the tree of nodes, determined by comparing the semantic identifier for a respective node of the tree of nodes with one or more semantic identifiers of respective one or more nodes of the existing aggregation hierarchy, a corresponding child node in the existing aggregation hierarchy, creating a node in the target aggregation hierarchy based on applying the aggregation method to the corresponding child nodes by retrieving values from the corresponding child nodes, applying the aggregation method to the retrieved values to provide an aggregation result, and storing the aggregation result in the created node in the target aggregation hierarchy;

for each node in the tree of nodes that does not have a corresponding node in the existing aggregation hierarchy or a corresponding child node for each child node of one or more child nodes of the respective node of the tree of nodes, determined by comparing the semantic identifier for a respective node of the tree of nodes with one or more semantic identifiers of respective one or more nodes of the existing aggregation hierarchy, creating a node in the target aggregation hierarchy based on applying the aggregation method to each child node of one or more child nodes of the respective node of the tree of nodes by retrieving values from the corresponding child nodes, applying the aggregation method to the retrieved values to provide an aggregation results, and storing the aggregation result in the created node in the target aggregation hierarchy;

returning the report attribute aggregation result, the report attribute aggregation result comprising a value associated with a root node of the target aggregation hierarchy as a data aggregation result, wherein the value is an aggregated value using the aggregation method for one or more child nodes of the target aggregation hierarchy; and generating the report, the report comprising the report attribute aggregation result.

2. The computer-implemented method of claim 1, the operations further comprising:

identifying a common dimension identifier associated with the tree of nodes and a corresponding common dimension identifier associated with the existing aggregation hierarchy;

receiving a criteria regarding the common dimension identifier; and filtering out nodes from the existing aggregation hierarchy based on the received criteria.

3. The computer-implemented method of claim 1, wherein the semantic identifier comprises a shared group identifier retrieved from a configuration table associated with the aggregation method.

4. The computer-implemented method of claim 1, wherein the nodes included in the tree of nodes is determined by a hierarchy table.

5. The computer-implemented method of claim 1, wherein the existing aggregation hierarchy is the result of performing the aggregation method on a second tree of nodes.

6. The computer-implemented method of claim 1, further comprising:

performing the executing the data aggregation request for at least first and second existing aggregation hierarchies.

7. The computer-implemented method of claim 1, wherein the semantic identifiers comprise shared group identifiers retrieved from a configuration table associated with the aggregation method.

8. A computing apparatus facilitating generating a predictive analytics user interface, the computing apparatus comprising:

a processor; and a memory storing instructions that, when executed by the processor, configures the apparatus to perform operations for executing a query to generate and return an aggregation result to be displayed on the predictive analytics user interface, the operations comprising:

evaluating a plurality of target report attributes, the evaluating comprising evaluating a flag indicating whether a respective attribute is associated with a hierarchy;

for report attributes determined to be associated with a hierarchy:

retrieving attributes associated with one or more existing reports;

comparing semantic identifiers of target report attributes with semantic identifiers of attributes of the one or more existing reports;

for target report attributes having a semantic identifier matching a semantic identifier of an existing report attribute, generating a data aggregation request, the data aggregation request comprising a tree of nodes, each node having a semantic identifier, and an aggregation method; and executing the data aggregation request to generate a target aggregation hierarchy, the executing the data aggregation request comprising:

for each node in the tree of nodes having a corresponding node in the existing aggregation hierarchy, determined by comparing the semantic identifier for a respective node of the tree of nodes with one or more semantic identifiers of respective one or more nodes of the existing aggregation hierarchy, creating a node in the target aggregation hierarchy by retrieving a value of the respective corresponding node and storing the value in the respective created node;

for each node in the tree of nodes that does not have a corresponding node in the existing aggregation hierarchy, determined by comparing the node identifier for a respective node of the tree of nodes with one or more semantic identifiers of respective one or more nodes of the existing aggregation hierarchy, but does have, for each child node of one or more child nodes of the respective node of the tree of nodes, determined by comparing the semantic identifier for a respective node of the tree of nodes with one or more semantic identifiers of respective one or more nodes of the existing aggregation hierarchy, determined by comparing the semantic identifier for a respective node of the tree of nodes to one or more semantic identifiers of respective one or more nodes of the existing aggregation hierarchy, a corresponding child node in the existing aggregation hierarchy, create a node in the target aggregation hierarchy based on applying the aggregation method to the corresponding child node by retrieving values from the corresponding one or more child nodes, applying the aggregation method to the retrieved values to provide an aggregation result, and storing the aggregation result in the created node in the target aggregation hierarchy;

for each node in the tree of nodes that does not have a corresponding node in the existing aggregation hierarchy or a corresponding child node for each child node of one or more child nodes of the respective node of the tree of nodes, determined by comparing the semantic identifier for a respective node of the tree of nodes with one or more semantic identifiers of respective one or more nodes of the existing aggregation hierarchy, creating a node in the target aggregation hierarchy based on applying the aggregation method to each child node of one or more child nodes of the respective node of the tree of nodes by retrieving values from the corresponding child nodes, applying the aggregation method to the retrieved values to provides an aggregation results, and storing the aggregation result in the created node in the target aggregation hierarchy; and returning the aggregation result, the aggregation result comprising a value associated with a root node of the target aggregation hierarchy, as a data aggregation result, wherein the value is an aggregated value using the aggregation method for one or more child nodes of the target aggregation hierarchy.

9. The computing apparatus of claim 8, the operations further comprising:
identifying a common dimension associated with the tree of nodes and a corresponding common dimension associated with the existing aggregation hierarchy;
receiving a criteria regarding the common dimension; and
filtering out nodes from the existing aggregation hierarchy based on the received criteria.

10. The computing apparatus of claim 8, wherein the semantic identifier comprises a shared group identifier retrieved from a configuration table associated with the aggregation method.

11. The computing apparatus of claim 8, wherein the aggregation method is one of summation, count, or average.

12. The computing apparatus of claim 8, wherein the tree of nodes is defined using a graph database.

13. The computing apparatus of claim 8, further comprising:
performing the executing the data aggregation request for at least first and second existing aggregation hierarchies.

14. The computing apparatus of claim 8, further comprising:
making a transportation resource allocation decision based on the target aggregation hierarchy.

15. A non-transitory computer-readable storage medium facilitating generating a predictive analytics user interface, the computer-readable storage medium including instructions that when executed by a computer, cause the computer to:
receive a report attribute of a plurality of report attributes of a target report;
from metadata associated with the report attribute, determine that the report attribute is a hierarchical report attribute;
retrieve attributes associated with one or more existing reports;
comparing a semantic identifier of the target report attribute with semantic identifiers of the one or more existing reports;
for target report attributes having a semantic identifier matching a semantic identifier of an attribute of an existing report, generating a data aggregation request, the data aggregation request comprising a tree of nodes, each node having a semantic identifier, and an aggregation method;
executing the data aggregation request to generate a target aggregation hierarchy, the executing the data aggregation request comprising:
for each node in the tree of nodes having a corresponding node in the existing aggregation hierarchy, determined by comparing the semantic identifier for a respective node of the tree of nodes with one or more semantic identifiers of respective one or more nodes of the existing aggregation hierarchy, create a node in the target aggregation hierarchy by retrieving a value of the corresponding node and storing the value in the respective created node;
for each node in the tree of nodes that does not have a corresponding node in the existing aggregation hierarchy, determined by comparing the semantic identifier for a respective node of the tree of nodes with one or more semantic identifiers of respective one or more nodes of the existing hierarchy, but does have, for each child node of one or more child nodes of the respective node of the tree of nodes, determined by comparing the semantic identifier for a respective node of the tree of nodes with one or more semantic identifiers of respective one or more nodes of the existing aggregation hierarchy, a corresponding child node in the existing aggregation hierarchy, create a node in the target aggregation hierarchy based on applying the aggregation method to the corresponding child nodes by retrieving values from the corresponding one or more child nodes, applying the aggregation method to the retrieved values to provide an aggregation result, and storing the aggregation result in the created node in the target aggregation hierarchy;
for each node in the tree of nodes that does not have a corresponding node in the existing aggregation hierarchy or a corresponding child node for each child node of one or more child nodes of the respective node of the tree of nodes, determined by comparing the semantic identifier of a respective node of the tree of nodes to one or more semantic identifiers of respective one or more nodes of the existing aggregation hierarchy, create a node in the target aggregation hierarchy based on applying the aggregation method to each child node of one or more child nodes of the respective node of the tree of nodes by retrieving values from the corresponding child nodes, applying the aggregation method to the retrieved values to provide an aggregation result, and storing the aggregation result in the created node in the target aggregation hierarchy; and return the aggregation result, the aggregation result comprising a value associated with a root node of the target aggregation hierarchy, as a data aggregation result, wherein the value is an aggregated value using the aggregation method for one or more child nodes of the target aggregation hierarchy.

16. The non-transitory computer-readable storage medium of claim 15, wherein the semantic identifier comprises a shared identifier in a configuration table.

17. The non-transitory computer-readable storage medium of claim 15, wherein the computer-readable storage medium further comprises a configuration table that includes a column identifying whether an attribute of a node of a tree of nodes comprises hierarchical data.

18. The non-transitory computer-readable storage medium of claim 15, wherein the computer-readable storage medium further comprises a configuration table that includes a column identifying whether an attribute of a node of a tree of nodes comprises measurement data to be aggregated by the aggregation method.

19. The non-transitory computer-readable storage medium of claim 15, wherein the computer-readable storage medium further comprises a configuration table that includes a group identification column identifying used to determine correspondence between a node in the existing aggregation hierarchy and a node in the target aggregation hierarchy.

20. The non-transitory computer-readable storage medium of claim 15, wherein the computer-readable storage medium further comprises a configuration table that includes a column identifying the aggregation method.

* * * * *